(12) United States Patent
Brunner et al.

(10) Patent No.: US 10,377,313 B1
(45) Date of Patent: Aug. 13, 2019

(54) STEP ASSEMBLY OF A MOTOR VEHICLE

(71) Applicant: Webasto SE, Stockdorf (DE)

(72) Inventors: Stefan Brunner, Detroit, MI (US); Paul Finch, Northville, MI (US)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/129,307

(22) Filed: Sep. 12, 2018

(51) Int. Cl.
*B60R 3/02* (2006.01)
*B60R 3/00* (2006.01)

(52) U.S. Cl.
CPC .............. *B60R 3/02* (2013.01); *B60R 3/002* (2013.01); *B60Y 2200/11* (2013.01)

(58) Field of Classification Search
CPC .................................. B60R 3/02; B60R 3/002
See application file for complete search history.

(56) References Cited

U.S. PATENT DOCUMENTS

| | | | |
|---|---|---|---|
| 2005/0258616 A1* | 11/2005 | Scheuring, III | B60R 3/002 280/166 |
| 2008/0100023 A1* | 5/2008 | Ross | B60R 3/002 280/166 |
| 2013/0154230 A1* | 6/2013 | Ziaylek | B60R 3/02 280/166 |
| 2016/0288718 A1* | 10/2016 | Hayes | B60R 3/02 |
| 2016/0355138 A1* | 12/2016 | Smith | B60R 3/02 |
| 2017/0036607 A1* | 2/2017 | Du | B60R 3/02 |
| 2017/0274828 A1* | 9/2017 | Woodhouse | B60R 3/02 |
| 2018/0257572 A1* | 9/2018 | Du | B60R 3/002 |

* cited by examiner

*Primary Examiner* — Brian L Swenson

(74) *Attorney, Agent, or Firm* — Fitch, Even, Tabin & Flannery, LLP

(57) ABSTRACT

A step assembly of a motor vehicle is described which may have a vehicle-attached bearing assembly for connecting the step assembly to a vehicle body, a lowerable step, and actuating kinematics for the lowerable step, wherein the actuating kinematics comprise a link assembly in each of the two end portions of the lowerable step, each link assembly being displaceable by a drive link assembly between a retracted position, in which the lowerable step is in a lifted position, and an extended position, in which the lowerable step is in its lowered position. Trim parts which cover the link assemblies at least in the lifted position of the lowerable step may be disposed on the bearing assembly.

9 Claims, 6 Drawing Sheets

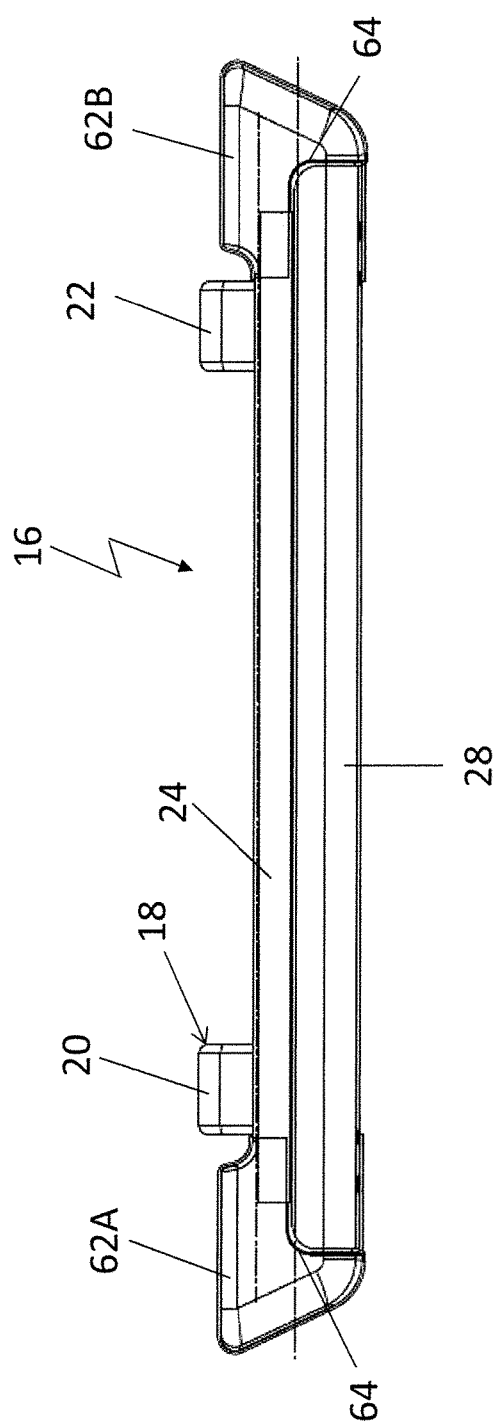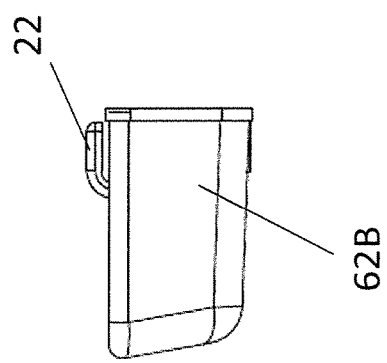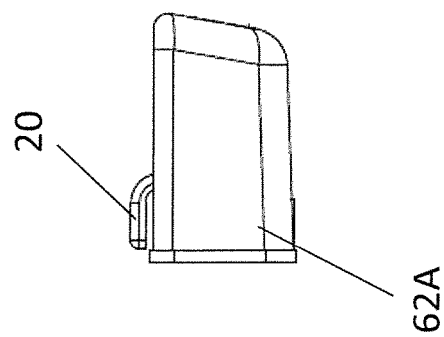

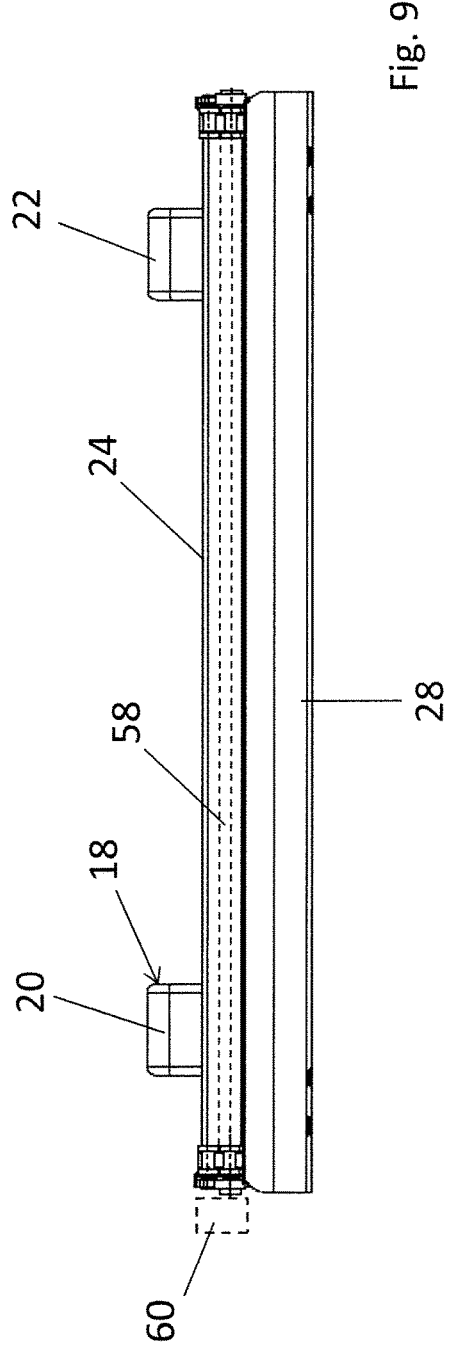
Fig. 9
Fig. 10
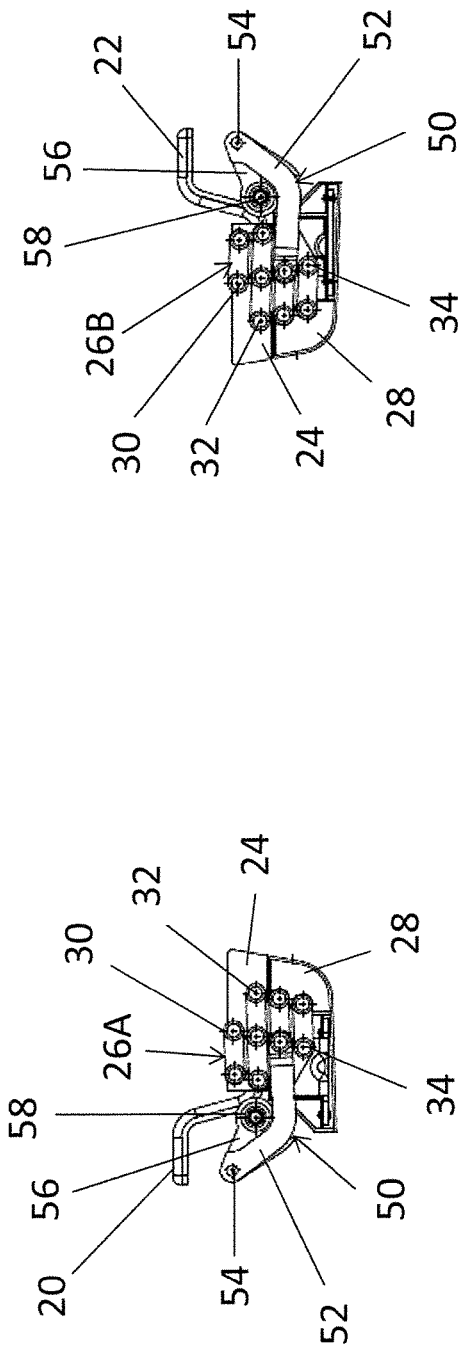
Fig. 11

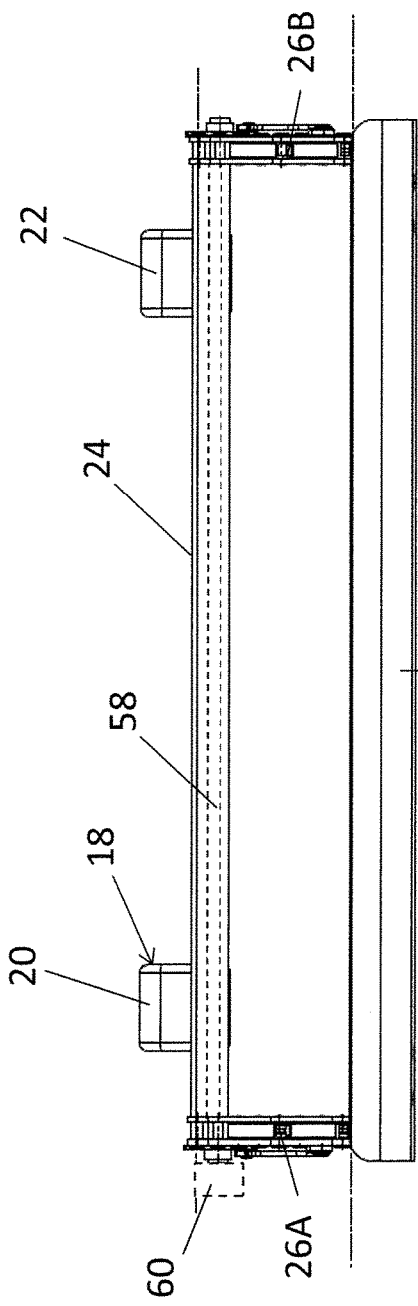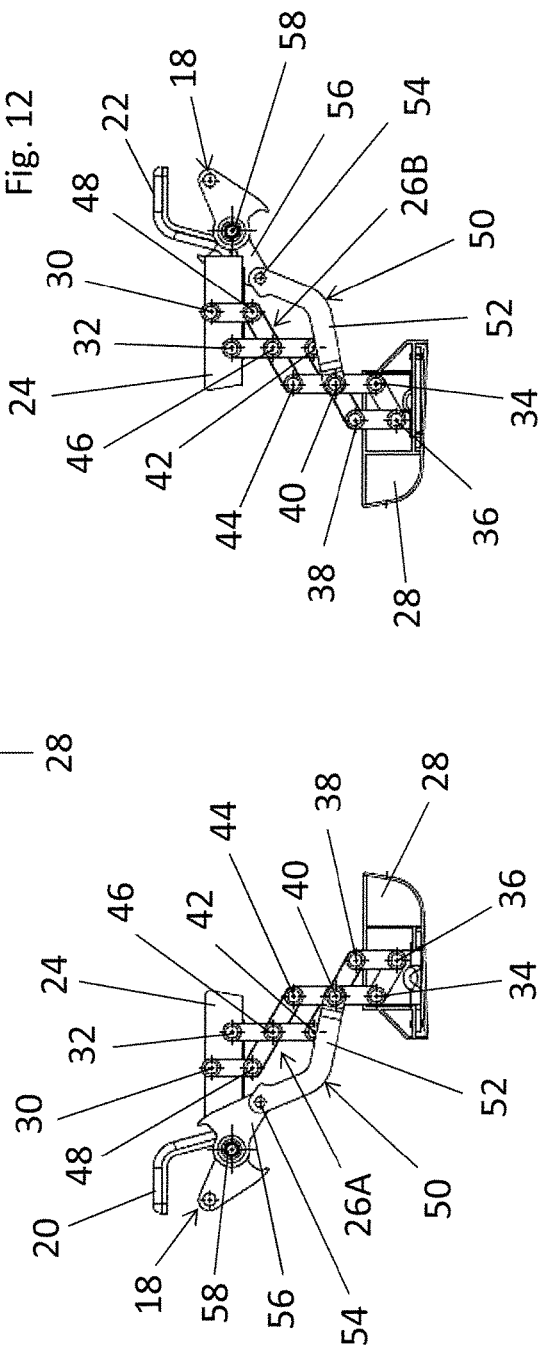

STEP ASSEMBLY OF A MOTOR VEHICLE

FIELD

The disclosure relates to step assemblies of a motor vehicle having a lowerable step, and particularly, according to one approach, a step assembly of a motor vehicle having trim parts which cover the link assemblies at least in the lifted position of the lowerable step which are disposed on the bearing assembly

BACKGROUND

From practical experience, it is known for a motor vehicle, in particular an all-terrain vehicle, to be provided with step assemblies in the area of the side doors to facilitate boarding, each step assembly having a fold-out and/or lowerable step which reduces the rise when boarding. In vehicles with high floors, in particular, this increases user comfort. For lowering the step, the step assembly comprises actuating kinematics.

SUMMARY

An object of the disclosed embodiment is to provide a step assembly of a motor vehicle which can be harmonically integrated into a vehicle body and which has reliable actuating kinematics for a lowerable step.

According to one approach, this object is attained by a step assembly of a motor vehicle having a vehicle-attached bearing assembly for connecting the step assembly to a vehicle body, a lowerable step, and actuating kinematics for the lowerable step, wherein the actuating kinematics may have a link assembly in each of the two end portions of the lowerable step, said link assemblies being displaceable by a drive link assembly between a retracted position, in which the lowerable step is in a lifted position, and an extended position, in which the lowerable step is in its lowered position, wherein trim parts which cover the link assemblies at least in the lifted position of the lowerable step are disposed on the bearing assembly.

In the case of the proposed step assembly, trim parts cover the kinematic elements of the actuating kinematics so that in the lifted position, which corresponds to the rest position or non-use position of the lowerable step, they are invisible from the outside and thus also protected from environmental conditions. The trim parts can be adapted to the vehicle structure in such a manner that the proposed step assembly can be harmonically integrated into the design of the motor vehicle in question.

It is conceivable for another corresponding link assembly of the actuating kinematics, which has a stabilizing effect, to be connected to the middle portion of the lowerable step.

According to one approach, in order for the lowerable step to not form a potentially inconvenient protrusion when in its lifted position, the trim parts can cover the lowerable step at its end faces in the lifted position.

The step assembly may have multiple steps. In a specific embodiment of the present step assembly, an upper step is disposed on the vehicle-attached bearing assembly. In this case, the upper step is also vehicle-attached and forms a second stepping aid for boarding or exiting the vehicle.

The upper step together with the trim parts can form a receiving space for the lowerable step in its lifted position. The lowerable step itself can have an underside that is flush with the undersides of the trim parts adjacent at the end faces or sides when the lowerable step is in the lifted position.

In one embodiment of the present step assemblies, each link assembly is formed by a scissor lever assembly. When the scissor lever assemblies are in the retracted position, the lowerable step is in its lifted position. When the lever assemblies are in the extended state, the lowerable step is in its lowered position or use position.

For stable mounting of the lowerable step on the bearing assembly, each scissor lever assembly is connected to the bearing assembly via two points of articulation and to the lowerable step via two points of articulation.

The motor vehicle can be of different type, for example an off-road vehicle having two side doors (short type) or four side doors (long type).

In a specific embodiment, in which the links of the scissor lever assemblies, when in the lifted position, can be advantageously received by the housings formed by the trim parts while a sufficient range for displacement remains available, the scissor lever assemblies each comprise six links which are connected to each other via six points of articulation.

For securing the lowered position and/or the lifted position, it is advantageous if the drive link assembly is in an over-center position when the lowerable step is in the lowered position and/or in the lifted position.

According to a further aspect, a motor vehicle is proposed which has a step assembly having a vehicle-attached bearing assembly for connecting the step assembly to a vehicle structure, a lowerable step, and actuating kinematics for the lowerable step, wherein the actuating kinematics comprise a link assembly in each of the two end portions of the lowerable step, said link assembly being displaceable by a drive link assembly between a retracted position, in which the lowerable step is in a lifted position, and an extended position, in which the lowerable step is in its lowered position, wherein trim parts which cover the link assemblies at least in the lifted position of the lowerable step are disposed on the bearing assembly.

Other advantages and advantageous embodiments of the subject-matter of the present embodiments are apparent from the description, the drawing and the claims.

BRIEF DESCRIPTION OF THE DRAWINGS

An exemplary embodiment of a motor vehicle having a step assembly is illustrated in the drawing in a schematically simplified manner and will be explained in more detail in the following description.

FIG. 3 shows a side view of the step assembly with the lowerable step in the lifted position.

FIG. 4 shows a front view of the step assembly with the lowerable step in the lifted position.

FIG. 5 shows a back view of the step assembly with the lowerable step in the lifted position.

FIG. 9 shows a side view of the step assembly without trim parts with the lowerable step in the lifted position.

FIG. 10 shows a front view of the step assembly without trim parts with the lowerable step in the lifted position.

FIG. 11 shows a back view of the step assembly without trim parts with the lowerable step in the lifted position.

FIG. 12 shows a side view of the step assembly without trim parts corresponding to FIG. 9, but with the lowerable step in the lowered position.

FIG. 13 shows a front view of the step assembly without trim parts with the lowerable step in the lowered position.

FIG. 14 shows a back view of the step assembly without trim parts with the lowerable step in the lowered position.

DETAILED DESCRIPTION

Figure 1:
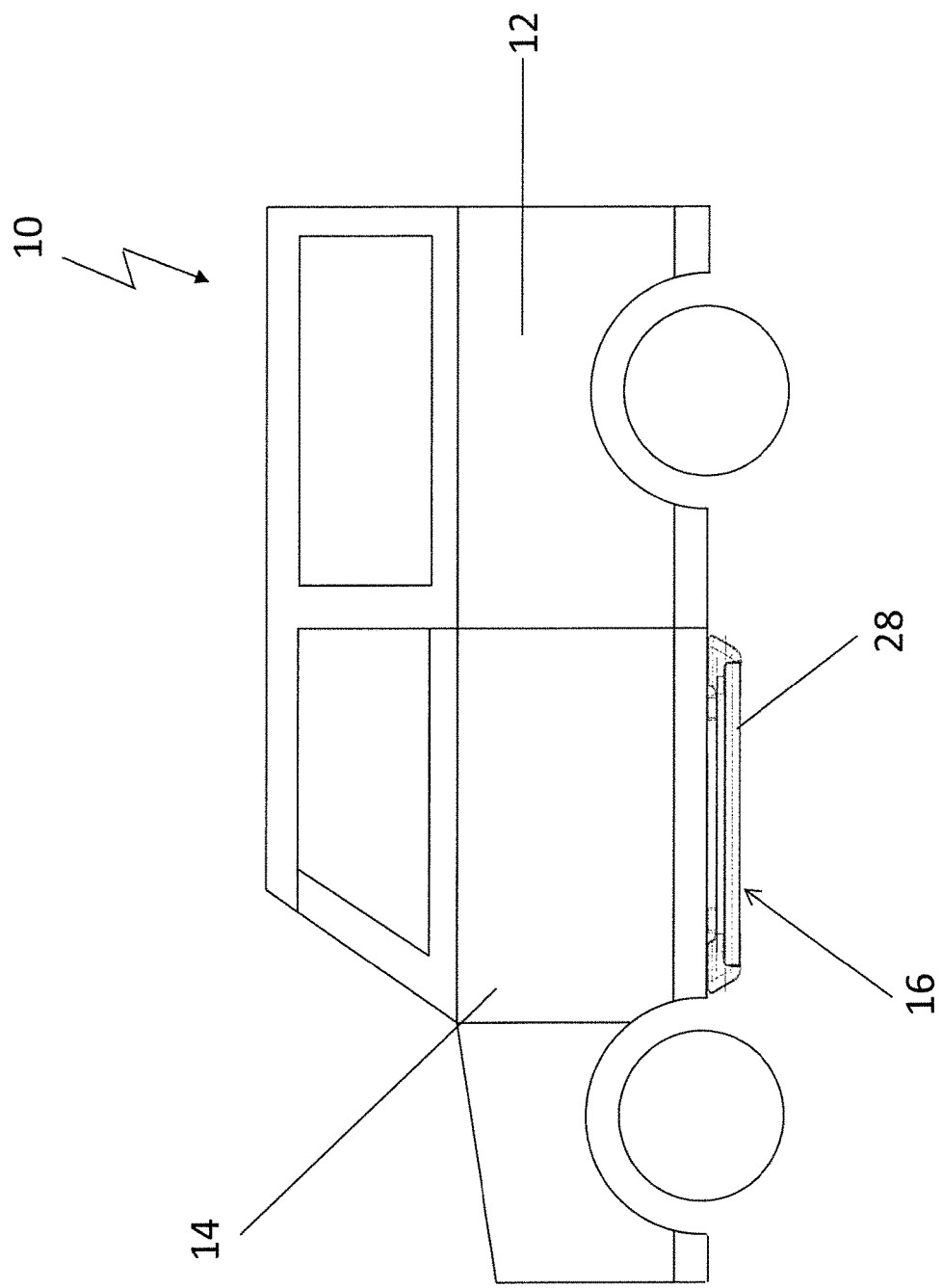
FIG. 1 shows a side view of an all-terrain vehicle having a step assembly with the lowerable step in a lifted position.

The drawing illustrates a motor vehicle 10 which is realized as an all-terrain vehicle and which comprises a vehicle body 12 which has a side door 14 on either side of a vertical longitudinal center plane of the vehicle, through which a driver or passenger can enter the vehicle interior.

Figure 2:
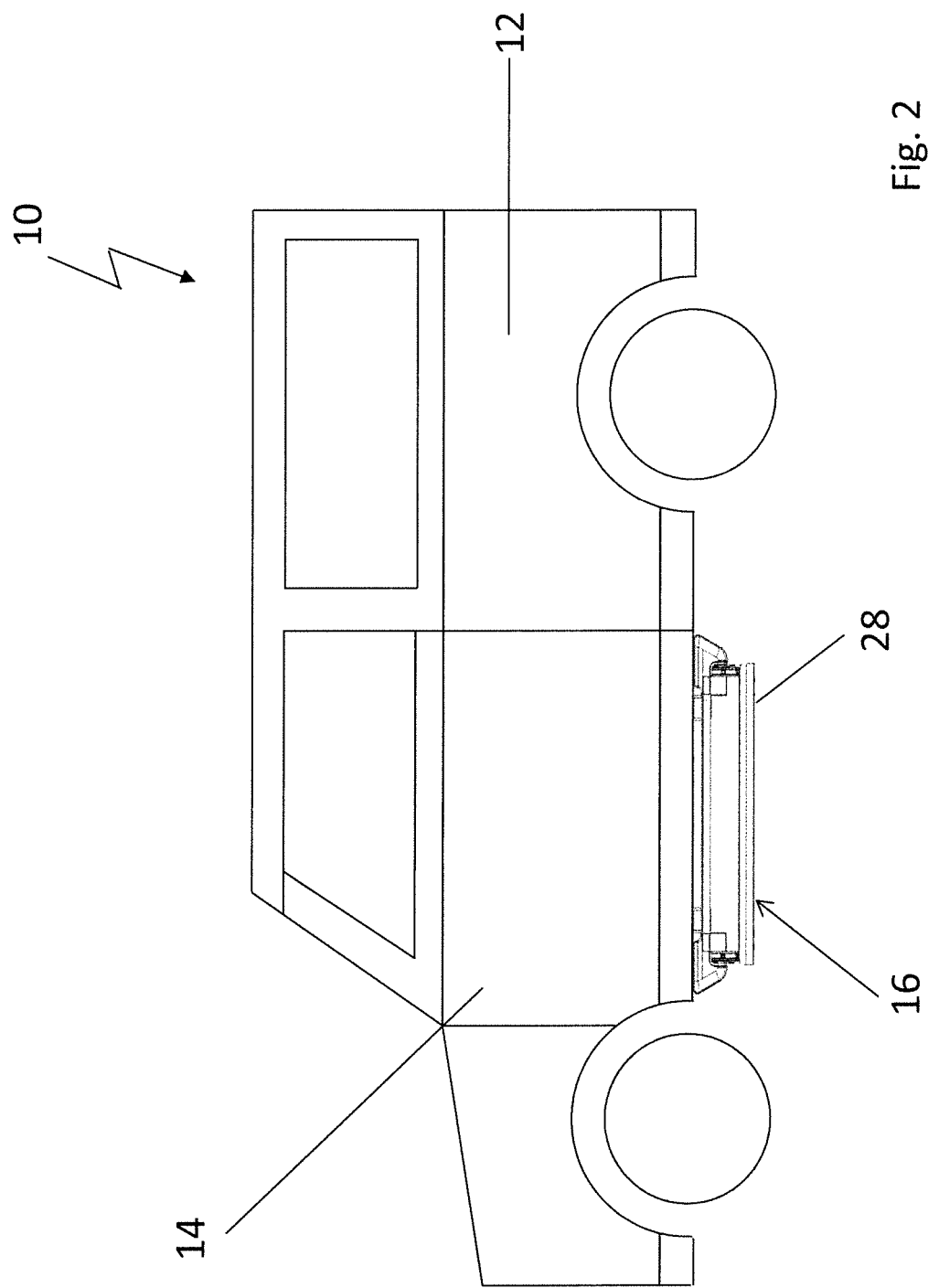
FIG. 2 shows a side view of the all-terrain vehicle corresponding to FIG. 1, but with the lowerable step in a lowered position.
Figure 6:
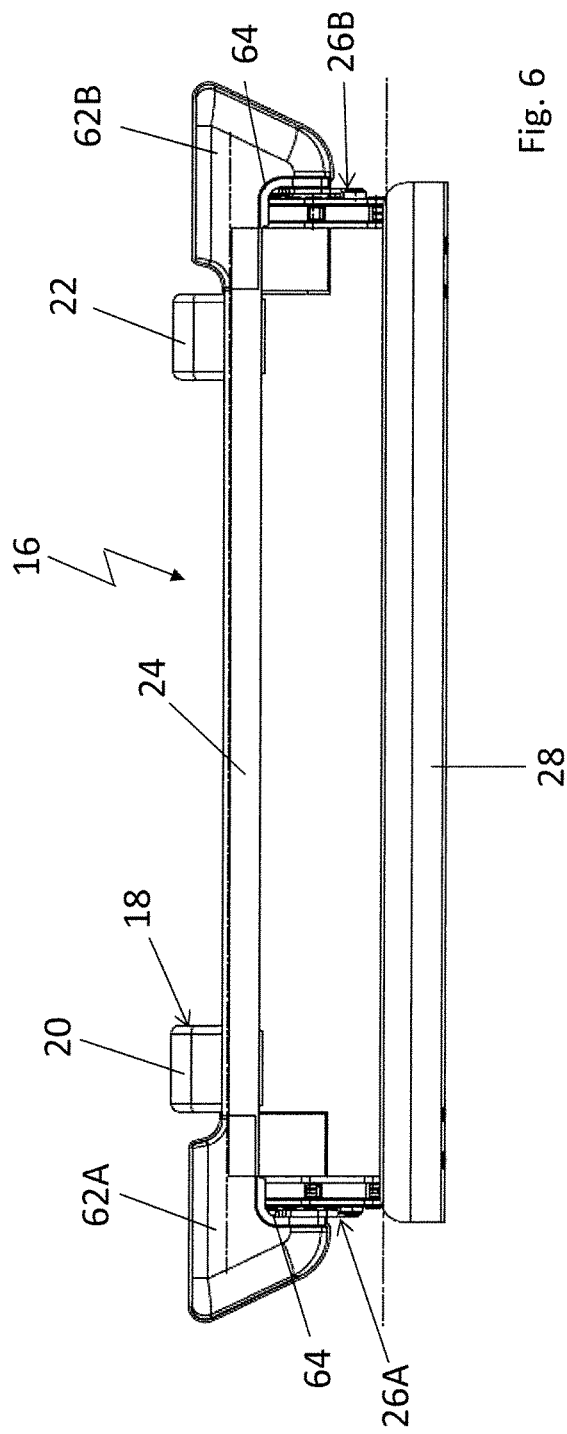
FIG. 6 shows a side view of the step assembly corresponding to FIG. 3, but with the lowerable step in the lowered position.
Figure 7:
FIG. 7 shows a front view of the step assembly with the lowerable step in the lowered position.
Figure 8:
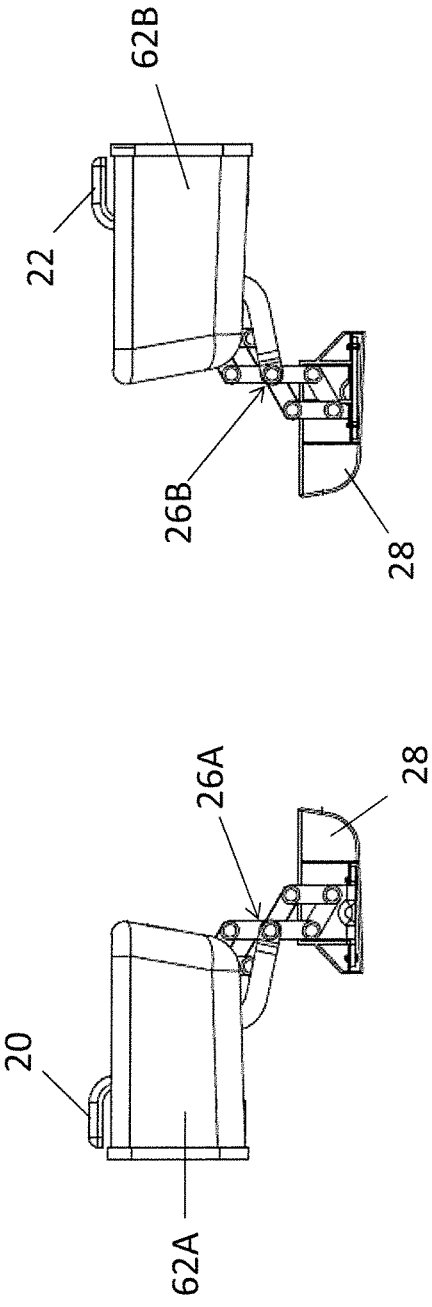
FIG. 8 shows a back view of the step assembly with the lowerable step in the lowered position.

To facilitate entering and exiting the vehicle interior, a step assembly 16 is disposed below each of the side doors 14, each step assembly 16 being displaceable between a rest position or non-use position, which is illustrated in FIG. 1, and a lowered position or use position, which is illustrated in FIG. 2.

The step assembly 16 shown on its own in FIGS. 3 to 14 has a bearing assembly 18 which can be permanently connected to the vehicle body 12, for which purpose it has two bearing brackets 20 and 22 which bear against a longitudinal beam (not illustrated) of the vehicle body 12 from above. The bearing assembly 18 is provided with a vehicle-fixed upper step 24, which may be disposed on a support.

On a longitudinal member of the bearing assembly 18, which may also be formed by the upper step 24, link assemblies 26A and 26B by means of which a lowerable second step can be displaced between a lifted position, which is shown in FIGS. 3, 9 and 10, and a lowered position, which is shown in FIGS. 6, 7, 8, 12, 13 and 14, are connected to both end faces. The link assemblies 26A and 26B are each configured as a scissor lever assembly having six links which are connected to the upper step 24 and to the bearing assembly 18 via two points of articulation 30 and 32, and to the lowerable step 26 via two points of articulation 34 and 36. The six links of the scissor lever assembly are connected to each other via a total of six articulations 38, 40, 42, 44, 46 and 48.

For being driven, the link assemblies 26A and 26B are each connected to a drive link assembly 50 via point of articulation 40, said drive link assembly 50 having a first link 52 and a second link 56, which is connected to link 52 via an articulation 54 and which is connected to a drive shaft 58 which can be driven by a drive motor 60. The drive shaft 58 is a shared drive shaft for the two link assemblies 26A and 26B, which are mirror symmetrical to each other. Thus, it also constitutes a coupling rod.

In the lifted position of the lowerable step 26 as illustrated in FIGS. 10 and 11, the links 52 and 56 of the drive link assemblies 50 each are in an over-center position relative to each other, thus preventing the lowerable step 26 from being accidentally displaced into the lowered use position even when a correspondingly directed pulling force is exerted thereon. The only way the lowerable step 26 can be displaced into the lowered position is by actuation of the drive motor 60.

As can be seen in FIGS. 3 to 8, end-face trim parts 62A and 26B are disposed on the bearing assembly 18, said trim parts 62A and 62B being mirror symmetrical to each other and covering the upper step 24 in its end portions almost up to the bearing brackets 20 and 22. In their lower portion, the trim parts 62A and 62B each form a receiving space 64 in which the end portions of the lowerable step 28 are received when the lowerable step 28 is in its lifted position as illustrated in FIG. 3. The receiving spaces 64 are formed in such a manner that the underside of the lowerable step 28 is at least largely flush with the undersides of the trim parts 62A and 62B when in the lifted position.

The trim parts 62A and 62B, which are made of plastic, cover the link assemblies 26A and 26B and the end faces of the lowerable step 28, which are located at the front and at the rear with respect to the vehicle orientation, when the lowerable step 28 is in the lifted position.

As can be seen in FIGS. 3 to 5, when the lowerable step 28 is in the lifted position, the trim parts 62A and 62B, the lowerable step 28 and the vehicle-attached upper step 24 together form a compact housing which is adapted to the design of the all-terrain vehicle and which protects the actuating kinematics, which are formed by the link assemblies 26A and 26B and the associated drive link assemblies 50 and the drive motor 60, from damage.

The drive motor 60 is connected to a motor controller which controls the drive motor 60 as a function of the status of the all-terrain vehicle 10. For example, it can be ensured in this way that the lowerable step 28 is in its lifted position while the all-terrain vehicle 10 is being driven.

The invention claimed is:

1. A step assembly of a motor vehicle, comprising:
   a vehicle-attached bearing assembly for connecting the step assembly to a vehicle structure, a lowerable step, and actuating kinematics for the lowerable step,
   wherein the actuating kinematics comprise a link assembly in each of the two end portions of the lowerable step, the link assembly being displaceable by a drive link assembly between a retracted position, in which the lowerable step is in a lifted position, and an extended position, in which the lowerable step is in its lowered position,
   wherein trim parts which cover the link assemblies at least in the lifted position of the lowerable step are disposed on the bearing assembly, and
   wherein each link arrangement is formed by a scissor lever assembly.

2. The step assembly according to claim 1, wherein the trim parts cover the lowerable step at its end faces in the lifted position.

3. The step assembly according to claim 1, wherein an upper step is disposed on the bearing assembly.

4. The step assembly according to claim 3, wherein the upper step together with the trim parts defines a receiving space for the lowerable step in its lifted position.

5. The step assembly according to claim 3, wherein the upper step is shorter than the lowerable step.

6. The step assembly according to claim 1, wherein each scissor lever assembly is connected to the bearing assembly via two points of articulation and to the lowerable step via two points of articulation.

7. The step assembly according to claim 1, wherein each scissor lever assembly comprises six links which are connected to each other via six points of articulation.

8. A step assembly of a motor vehicle, comprising:
   a vehicle-attached bearing assembly for connecting the step assembly to a vehicle structure, a lowerable step, and actuating kinematics for the lowerable step, wherein the actuating kinematics comprise a link assembly in each of the two end portions of the lowerable step, the link assembly being displaceable by a drive link assembly between a retracted position, in which the lowerable step is in a lifted position, and an extended position, in which the lowerable step is in its lowered position, wherein trim parts which cover the link assemblies at least in the lifted position of the lowerable step are disposed on the bearing assembly; and wherein the drive link assembly is in an over-center position when the lowerable step is in the lowered position and/or in the lifted position.

9. Motor vehicle having a step assembly, which comprises a vehicle-attached bearing assembly for connecting the step assembly to a vehicle structure, a lowerable step, and actuating kinematics for the lowerable step, wherein the actuating kinematics comprise a link assembly in each of the two end portions of the lowerable step, the link assembly being displaceable by a drive link assembly between a retracted position, in which the lowerable step is in a lifted position, and an extended position, in which the lowerable step is in its lowered position, wherein trim parts which cover the link assemblies at least in the lifted position of the lowerable step are disposed on the bearing assembly, and wherein each link arrangement is formed by a scissor lever assembly.

* * * * *